(12) United States Patent
Ricketts et al.

(10) Patent No.: US 9,844,922 B2
(45) Date of Patent: Dec. 19, 2017

(54) BAMBOO LAMINATE TRANSACTION CARD (71) Applicant: Travel Tags, Inc., North Mankato, MN (US)

(72) Inventors: Roger H. Ricketts, Apple Valley, MN (US); Steven C. Dunn, St. Louis Park, MN (US); David L. Williams, Prescott, WI (US)

(73) Assignee: Travel Tags, Inc., North Mankato, MN (US)

( * ) Notice: Subject to any disclaimer, the term of this patent is extended or adjusted under 35 U.S.C. 154(b) by 210 days.

(21) Appl. No.: 14/692,313

(22) Filed: Apr. 21, 2015

(65) Prior Publication Data

US 2015/0298429 A1    Oct. 22, 2015

Related U.S. Application Data

(60) Provisional application No. 61/982,170, filed on Apr. 21, 2014.

(51) Int. Cl.
*B32B 9/02* (2006.01)
*B32B 5/12* (2006.01)
(Continued)

(52) U.S. Cl.
CPC .................. *B32B 9/02* (2013.01); *B32B 5/12* (2013.01); *B32B 7/12* (2013.01); *B32B 9/06* (2013.01);
(Continued)

(58) Field of Classification Search
CPC ....................................................... B32B 9/02
(Continued)

(56) References Cited

U.S. PATENT DOCUMENTS 4,810,551 A * 3/1989 Chu .......................... B27J 1/003
                                                     144/333
6,481,994 B1   11/2002 McCannel et al.
(Continued)

FOREIGN PATENT DOCUMENTS

CN        201304674 Y     9/2009

OTHER PUBLICATIONS

Jeff Hosking, Printout of "All About Engineered Wood Flooring", http://www.hoskinghardwood.com/Department/Hardwood-Floors/All-About-Engineered-Wood-Floors.aspx?dId=7&pageId=7 (last visited May 11, 2015), 4 pages.
(Continued)

*Primary Examiner* — Brent O'Hern
(74) *Attorney, Agent, or Firm* — Patterson Thuente Pedersen, P.A.

(57) ABSTRACT

Transaction and identification cards formed from raw bamboo assemblies including one or more raw bamboo layers optionally adhered to a paper backer. In one embodiment, a single raw bamboo assembly is adhered to a base or core substrate. Optionally, a second bamboo assembly is coupled to the first bamboo assembly, with or without a core layer sandwiched in between the bamboo assemblies, such that the card's top face includes a first bamboo layer and the card's bottom face includes a second bamboo layer. One or more image or graphic layers are then either printed directly onto the raw bamboo layer or laminated thereto. Optional protective substrates, films, or coatings are applied to or over the bamboo assembly to protect by sandwiching the one or more ink or printed layers between the protective layer and the raw bamboo layers.

32 Claims, 5 Drawing Sheets

(51) Int. Cl.
    *B32B 7/12*      (2006.01)
    *G06K 1/12*      (2006.01)
    *G06K 19/02*     (2006.01)
    *B32B 9/06*      (2006.01)
    *B42D 25/455*    (2014.01)
    *B42D 25/46*     (2014.01)
    *B42D 25/382*    (2014.01)
    *B42D 25/47*     (2014.01)
    *B42D 25/387*    (2014.01)
    *B32B 37/18*     (2006.01)
    *B32B 38/00*     (2006.01)
    *B32B 37/00*     (2006.01)
    *B32B 37/12*     (2006.01)
    *B32B 38/06*     (2006.01)

(52) U.S. Cl.
    CPC ......... *B42D 25/382* (2014.10); *B42D 25/387* (2014.10); *B42D 25/455* (2014.10); *B42D 25/46* (2014.10); *B42D 25/47* (2014.10); *G06K 1/125* (2013.01); *G06K 19/02* (2013.01); *B32B 37/0015* (2013.01); *B32B 37/12* (2013.01); *B32B 37/18* (2013.01); *B32B 38/06* (2013.01); *B32B 38/145* (2013.01); *B32B 2307/518* (2013.01); *B32B 2307/716* (2013.01); *B32B 2307/75* (2013.01); *B32B 2317/16* (2013.01); *B32B 2425/00* (2013.01)

(58) Field of Classification Search
    USPC .......................................................... 428/106
    See application file for complete search history.

(56) References Cited

U.S. PATENT DOCUMENTS 6,964,810 B2    11/2005    McCannel et al.
7,300,535 B2    11/2007    McCannel et al.

OTHER PUBLICATIONS

Joe Dusel, Printout of "Using Bamboo Plywood for Furniture and Cabinetry", http://www.woodistry.com/articles/BambooPlywood.htm (last visited May 11, 2015), 5 pages.

Build Direct, Printout of "How is Bamboo Flooring Made," http://learn.builddirect.com_/flooring/bamboo-flooring/how-bamboo-flooring-made/ (last visited May 11, 2015), 3 pages.

* cited by examiner

BAMBOO LAMINATE TRANSACTION CARD

RELATED APPLICATION

The present application claims the benefit of U.S. Provisional Application No. 61/982,170 filed Apr. 21, 2014, which is incorporated herein in its entirety by reference.

FIELD OF THE INVENTION

Embodiments relate generally to transaction cards, and more particularly to a transaction or financial card formed from bamboo materials.

BACKGROUND OF THE INVENTION

Bamboo has become an increasingly popular industrial material. Bamboo is a material from the grass family. Its root system, which grows far below the surface and produces new shoots each season, allows for the plant to re-grow itself each season. Bamboo can be used for building materials, etc., and may be harvested every five to six years. A new bamboo shoot can reach its full mature size in a single season, making it a highly sustainable and therefore desirable material. Bamboo is also recyclable which also adds to its desirability as an industrial material.

Because bamboo is a sturdy and durable grass, bamboo can be used for a number of products including laminate flooring as a substitute for conventional hardwood materials and other materials that are more limited in their availability, sustainability, and/or recyclability.

Conventional materials used for cards, such as transaction cards, including, but not limited to credit cards, debit cards, stored-value cards, gift cards, loyalty or reward cards, smart cards, phone cards and the like, and identification cards, such as drivers licenses, passports, business cards, access badges, and the like, are often made from durable plastics such as polyvinylchloride (PVC) or styrene. While one can create aesthetically unique cards using these traditional materials, these materials are often not recyclable and/or not made from sustainable resources, putting unnecessary stresses on the environment, such as landfill use (when the cards are discarded after use, e.g. sometimes only single use), and use of limited and/or harmful natural resources, such as petroleum oil used to make plastics.

There remains a need for an aesthetically unique card, manufactured from a durable yet sustainable material.

SUMMARY OF THE INVENTION

Cards according to embodiments of the invention generally include one or more raw bamboo assemblies that comprise a raw bamboo sheet comprising one or more adjacent bamboo layers and an optional paper backer adhered thereto. In one embodiment, a single raw bamboo sheet (single or multi-ply) is adhered to a base or core substrate. In another embodiment, a second bamboo sheet (single or multi-ply) is coupled to the first bamboo sheet, with or without a core layer sandwiched in between the bamboo assemblies, such that the card's top face comprises a first bamboo layer and the card's bottom face comprises a second bamboo layer. In yet another embodiment, a single raw bamboo assembly makes up the entire substrate of the card (exclusive of any ink, varnish, and/or laminate layers applied thereto), so that the face of the card and the back of the card comprise the first side of the single raw bamboo assembly and the second side of the single raw bamboo assembly. In any of the embodiments, one or more image or graphic layers are then either printed, embossed, burned, or otherwise applied directly or indirectly onto the raw bamboo layer or laminated thereto.

Optional protective substrates, films, or coatings are applied to or over the bamboo assembly, before and/or after printing, by sandwiching the one or more ink or printed layers between the protective layer and the raw bamboo layer (with or without one or more protective layers). In a first example, one or more ink or printed layers is applied directly to the raw bamboo layer, and one or more protective layers are applied over the one or more printed layers. In another example, one or more protective or primer layers are applied directly to the raw bamboo layer, one or more ink or printed layers is applied directly to the protective or primer layer(s), and one or more protective layers are applied over the one or more printed layers.

In one embodiment, the raw bamboo sheet (first and/or optional second sheet) comprises a bamboo plywood or multi-ply laminate having multiple adjacent bamboo layers, each layer having a patterned appearance, such as a grass grain. A patterned appearance of a first layer is substantially parallel to a patterned appearance of a second adjacent layer of the card. In an alternative embodiment, the patterned appearance of a first bamboo layer is substantially unparallel to the patterned appearance of an adjacent bamboo layer of the card, and more particularly, the patterned appearance of the first layer is substantially perpendicular to a patterned appearance of the adjacent second bamboo layer. This configuration can be repeated for as many bamboo layers as desired. For example, if there are three or more layers, each adjacent layer would have a patterned appearance substantially perpendicular to a layer above it. This bi- or multi-oriented or directional construction can increase overall durability or rigidity of the card, while minimizing curling that could otherwise occur as the moisture in the materials fluctuates.

The above summary is not intended to describe each illustrated embodiment or every implementation of the present invention. The figures and the detailed description that follow more particularly exemplify these embodiments.

While embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring to the Figures generally, a bamboo laminate card according to embodiments of the present invention provide sufficient durability to function as a transaction card or stored value card (e.g. CR80 card) while providing unique aesthetics. The cards can be used for any of a variety of purposes such as, for example, transaction cards (i.e. credit or debit cards, phone cards, calling cards, or gift cards, smart cards), loyalty cards (i.e. rewards cards, membership cards, key fobs, etc.) identification cards (i.e. drivers' licenses, other government/licensing cards, access cards, business cards, etc.), healthcare cards, membership/association cards, insurance cards, fleet management cards, gaming cards, trading cards and the like can have various pieces of data contained thereon. The data may be contained on or within machine readable indicia, in the form of human readable indicia, or combinations thereof. Examples of machine readable indicia include magnetic stripes, barcodes (including both 1D and 2D (e.g. QR code)), or RFID, for example. These machine readable indicia can be used for account activation, various verification purposes, and/or automated account look-up. Examples of human readable indicia include alphanumeric codes, symbols, or graphics. The machine readable indicia and/or human readable indicia may be correlated with an account, such as, but not limited to a prepaid account, a revolving account against which transactions are conducted, or a bank account such as a checking or savings account. Alternatively, or additionally, the machine readable indicia and/or human readable indicia may be used to identify something or someone or to gain access to a physical location, such as a building or room within a building.

The cards according to embodiments of the invention generally include one or more raw bamboo sheets or assemblies that comprise a single ply or multi-ply raw bamboo layer optionally adhered to a paper backer. In one embodiment, a single raw bamboo sheet or assembly is adhered to a base or core substrate. In another embodiment, a second bamboo sheet or assembly is coupled to the first bamboo sheet or assembly, with or without one or more core or substrate layers sandwiched in between the bamboo sheets or assemblies, such that the card's top face comprises a first bamboo layer and the card's bottom face comprises a second bamboo layer. In any of the embodiments, one or more image or graphic layers are then either printed directly onto the raw bamboo layer or laminated thereto. Optional protective substrates, films, or coatings are applied to or over the bamboo assembly to protect by sandwiching the one or more ink or printed layers between the protective layer and the raw bamboo layer.

In a particular embodiment in which the card comprises a CR80 card, the card is manufactured such that it meets meet current ISO 7810 Specifications, incorporated herein by reference in its entirety, including a card thickness of about 30 mil plus or minus 10%, and certain corner radius requirements and edge smoothness requirements.

Figure 1:
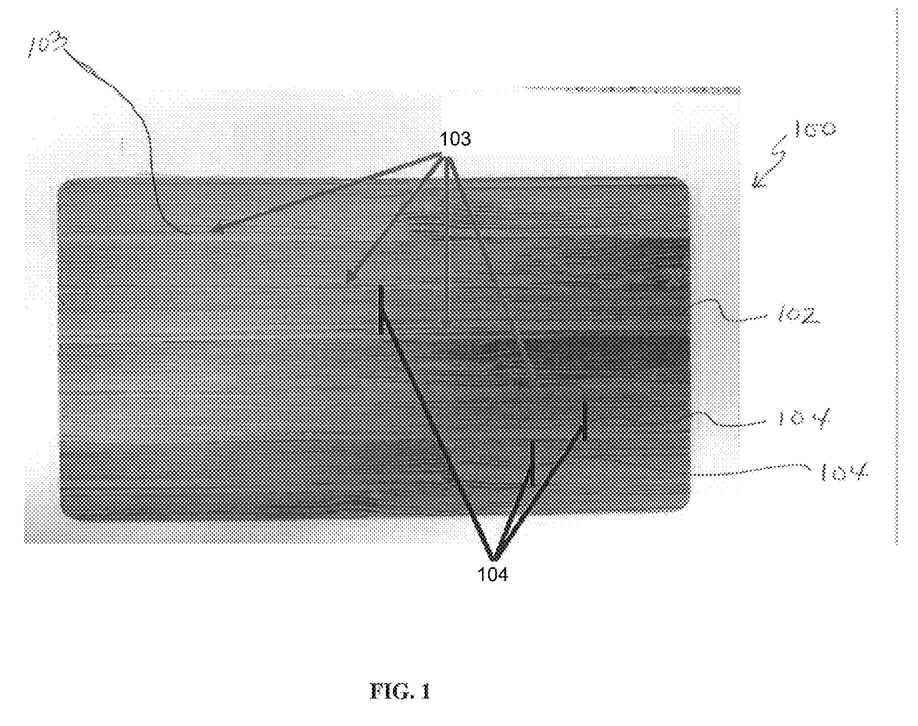
FIG. 1 is a top view of a bamboo laminate card according to an embodiment of the invention.

Referring to FIG. 1, a raw bamboo assembly 100 used in constructing the card assemblies of various embodiments comprises a raw bamboo sheet 102 optionally adhered to a paper backer (not shown). Raw bamboo sheet 102 generally comprises a plurality of laterally adjacent strips or planks 104, each having a slightly different pattern or grass grain separated by plank lines 103, adhered together to form the sheet of bamboo having an overall patterned appearance. For example, the pattern or grass grain of each lateral strip 104 can be substantially parallel to an adjacent strip, or in an alternative embodiment, can be substantially unparallel (e.g. angled or perpendicular). The overall patterned appearance can be defined as the direction of the grass grain of a majority of or all of the strips or planks of a layer.

Bamboo sheet 102 can comprise a single layer, such as a layer having a thickness of about 30 mils, or can comprise two or more thin bamboo veneer layers bonded or adhered together, and optionally to a core sheet of bamboo or other material, similar in construction to plywood. In one embodiment in which bamboo sheet 102 comprises multiple layers, an overall patterned appearance of a first bamboo layer is substantially parallel to an overall patterned appearance of a second adjacent bamboo layer of the card.

In an alternative embodiment, and referring to FIGS. 4A-4D, the overall patterned appearance of a first bamboo layer 105*a* of sheet 102 is substantially unparallel to the overall patterned appearance of an adjacent bamboo layer 105*b* of the card. More particularly, the patterned appearance of first layer 105*a* is substantially perpendicular to a patterned appearance of the adjacent second bamboo layer. This configuration can be repeated for as many bamboo layers as desired. For example, if there are three or more layers, each adjacent layer would have a patterned appearance substantially perpendicular to a layer above it. This bi- or multi-oriented or directional construction can increase overall durability or rigidity of the card, while minimizing curling that could otherwise occur as the moisture in the materials fluctuates.

The sheet of bamboo can be made similar to how bamboo plywood or bamboo laminate flooring is made. For example, as described at http://learn.builddirect.com/flooring/bamboo-flooring/how-bamboo-flooring-made/, incorporated herein by reference in its entirety, the green outer hull of the bamboo is removed and the stalk is cut into long strips called fillets that retain the natural curve of the plant. The strips are then milled or planed along the outer sides to create flat strips. The strips are then dried and boiled to remove moisture as well as natural sugars and starches so that the bamboo is less desirable to insects such as termites, and makes the bamboo less likely to suffer expansion and contraction in humid climates. The strips are then optional colored or darkened to a desired appearance through a process of carbonization. Carbonization relies on steam and pressure to darken the bamboo.

The strips are then glued and pressed together in a lateral configuration to form the overall patterned appearance, and optionally further milled or planed. One example of an overall patterned appearances of bamboo can include a strand-woven bamboo appearance in which during the milling stage of the bamboo processing, the strands that remain are trimmed from the long bamboo fillets. Intricate patterns are created by weaving the thin strands together and compressing them with a resin. Another example of an overall patterned appearance of bamboo is a vertical bamboo appearance in which the narrow edges of several strips of bamboo are glued together. These strips are combined and have a thin layer of lamination between them. Yet another example of an overall patterned appearance of bamboo is a horizontal bamboo appearance in which the wider surfaces are glued together, facing up.

As discussed above, as an alternative to a single layer or ply of bamboo, multiple sheets can be glued and/or pressed together, to form a multi-ply bamboo sheet 102. Single ply or multi-ply bamboo sheet 102 is then optionally adhered to a paper backer. For example, a 20 mil raw bamboo sheet (single or multi-ply) is adhered to a 15-20 mil kraft paper. Alternatively, a 10-15 mil raw bamboo sheet (single or multi-ply) is adhered to an 80 pound environmental paper. Alternatively, an approximately 15-17 mil raw bamboo sheet (single or multi-ply) is adhered to a 120 pound environmental paper. In yet another embodiment, a 10-40 mil, and more particularly 25-35 mil, raw bamboo sheet (single or multi-ply), is not adhered to a substrate (exclusive of ink, varnish, and/or protective coating layer(s)). Suppliers of bamboo sheets include, for example, SRWood of Clarksville, Ind. In the case of multiple plies, there may be multiple layers of adhesive and/or paper backer between layers as desired.

Figure 5:
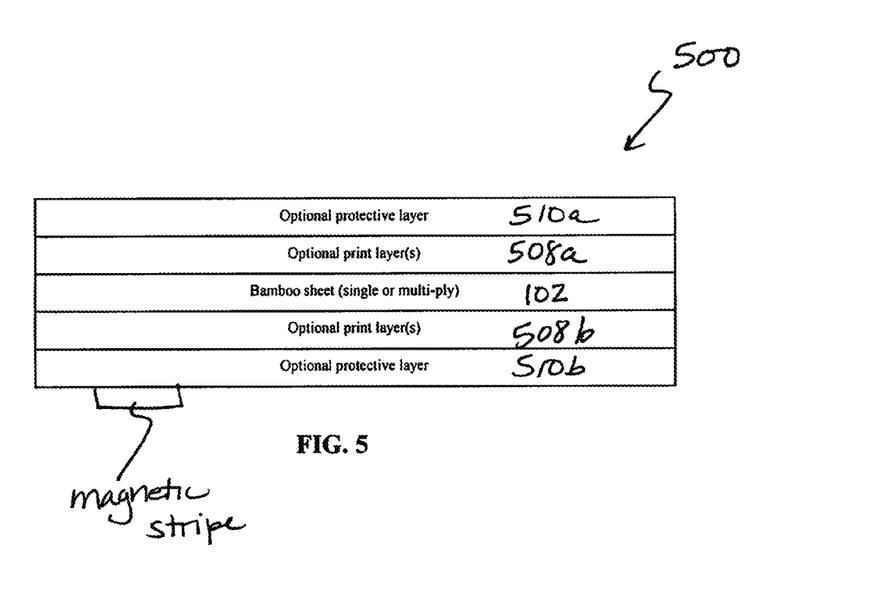
FIG. 5 is a cross-sectional view of a bamboo laminate card according to another embodiment of the invention.

Referring to FIG. 5, and according to an embodiment of the invention, card 500 includes a single ply or multi-ply bamboo sheet 102. Bamboo sheet 102 can be formatted as a single card or as a large or full sheet format (for example, 28"×40" sheets) for containing a plurality of articles, such as a plurality of stored data cards, key fobs, or combinations thereof. One or more optional print layer(s) 508*a*, 508*b* can be formed on a first and/or second major surface of bamboo sheet 102, respectively. Print layer(s) 508 can comprise any of a variety or combination of text, graphics, colors, human readable indicia, machine readable indicia, images, customer information, foils, special imaging indicia such as interlaced images and the like, or any of a variety of indicia and/or embellishments. Print layer(s) 508 can be applied to sheet 102 by using contact or contact-less methods including, but not limited to, flexography, lithography, laser, thermal, inkjet, drop-on-demand, xerography, screen printing (e.g. silkscreen), gravure, rotogravure, foil stamp, or combinations thereof. In one embodiment, print layer(s) 508 can be formed using high resolution printing techniques, and more particular computer-controlled digital-printing techniques such as, for example, laser imaging, ink jet including drop-on-demand (DOD) and continuous inkjet, thermal imaging, and/or xerographic imaging. A corresponding suitable ink, toner, or other printing medium is used depending the type(s) of printing methods including UV or radiation curable inks or toners, e-beam curable mediums, heat or IR curable, or combinations thereof. One or both major surfaces of sheet 102 can optionally be subjected to one or more printing pretreatments, including, but not limited to, corona treatment, flame treatment, application of a primer, or other treatments such that the surface of the bamboo sheet is modified to better bond with the printing medium.

Optional protective or laminate layer(s) 510*a*, 510*b* can be formed or applied over print layer(s) 508 to protect print layer(s) and/or bamboo sheet 102, respectively. Protective layer(s) 510 can comprise any of a variety laminates applied, such as by compression lamination, to one or both sides of card 500, or can comprise one or more coatings over one or both sides of card 500. In an embodiment in which protective layer 510 comprises a laminate, the laminate can be a bleed laminate having an adhesive, or an over-laminate without an adhesive. In a particular embodiment, the laminate comprises a soft touch nylon laminate film (matte or gloss).

Optionally, a magnetic stripe is applied via a magnetic stripe applicator to bamboo sheet 102 before being laminated to other layers, such as protective layer 510, and/or after assembly. Furthermore, the magnetic stripe can be applied to individual cards, or along a full sheet before cutting into individual cards.

Figure 2:
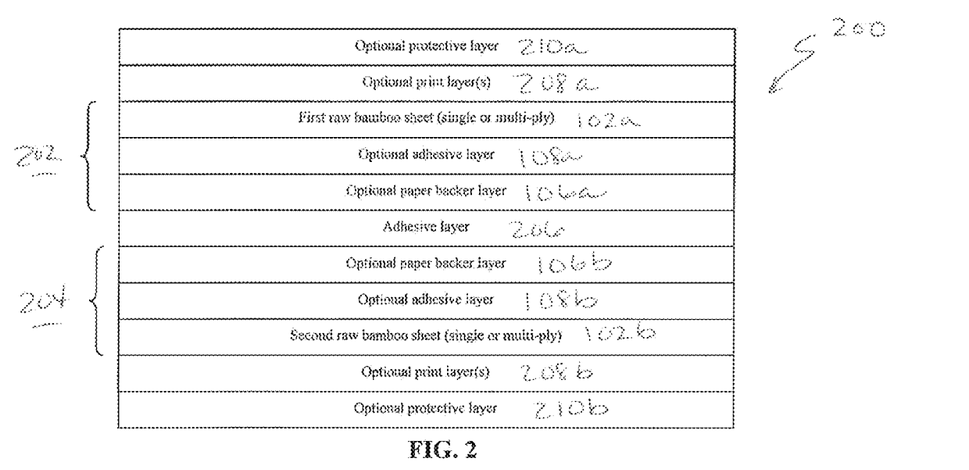
FIG. 2 is a cross-sectional view of a bamboo laminate card according to an embodiment of the invention.

Referring to FIG. 2, and according to an embodiment of the invention, a card 200 generally comprises a first raw bamboo assembly 202 including a single ply or multi-ply bamboo sheet 102*a* optionally adhered to a paper backer layer 106*a* via an adhesive layer 108*a*. A second bamboo assembly 204, including a single ply or multi-ply bamboo sheet 102*b* optionally adhered to a paper backer layer 106*b* via an adhesive layer 108*b*, is adhered to first bamboo assembly 202 via an adhesive layer 206, such that first and second bamboo sheets 102*a* and 102*b* form the exterior facing surfaces of card 200.

Bamboo sheets 102*a*, 102*b* can be formatted as a single card or as a large or full sheet format (for example, 28"×40" sheets) for containing a plurality of articles, such as a plurality of stored data cards, key fobs, or combinations thereof.

Adhesive layers 108*a*, 108*b*, and 206 can comprise any of a variety of suitable adhesives including, but not limited to, a multi-part urethane adhesives, epoxies, acrylate adhesives, radiation activated or curable adhesives including UV, IR and/or ebeam adhesives, pressure activated adhesives, or any of a combination thereof. Adhesive layers 108*a*, 108*b*, and 206 can be formed from the same adhesive or can be different adhesives.

In an embodiment, the patterned appearance direction of bamboo sheet 102*a* is substantially parallel to the patterned appearance direction of bamboo sheet 102*b*. In an alternative embodiment, a patterned appearance direction of bamboo sheet 102*a* is substantially perpendicular to a patterned appearance direction of bamboo sheet 102*b*, creating a bi-oriented construction. This bi-oriented construction provides added durability to card 200. Additional layers of bamboo (not shown) can be added to card 200 at any of a variety of directions to further increase durability and/or thickness as desired.

One or more optional print layer(s) 208*a*, 208*b* can be formed on first and/or second bamboo sheets 102*a*, 102*b*, respectively. Print layer(s) 208 can comprise any of a variety or combination of text, graphics, colors, human readable indicia, machine readable indicia, images, customer information, foils, special imaging indicia such as interlaced images and the like, or any of a variety of indicia and/or embellishments. Print layer(s) 208 can be applied to sheet 102(*a*), 102(*b*) by using contact or contact-less methods including, but not limited to, flexography, lithography, laser, thermal, inkjet, drop-on-demand, xerography, screen printing (e.g. silkscreen), gravure, rotogravure, foil stamp, or combinations thereof. In one embodiment, print layer(s) 208 can be formed using high resolution printing techniques, and more particular computer-controlled digital-printing techniques such as, for example, laser imaging, ink jet including drop-on-demand (DOD) and continuous inkjet, thermal imaging, and/or xerographic imaging. A corresponding suitable ink, toner, or other printing medium is used depending the type(s) of printing methods including UV or radiation curable inks or toners, e-beam curable mediums, heat or IR curable, or combinations thereof. Sheets 102(*a*), 102(*b*) can optionally be subjected to one or more printing pretreatments, including, but not limited to, corona treatment, flame treatment, application of a primer, or other treatments such that the surface of the bamboo sheet is modified to better bond with the printing medium.

Optional protective or laminate layer(s) 210*a*, 210*b* can be formed or applied over print layer(s) 208 to protect print layer(s) and/or bamboo sheet 102(*a*), 102(*b*), respectively. Protective layer(s) 210 can comprise any of a variety laminates applied, such as by compression lamination, to one or both sides of card 200, or can comprise one or more coatings over one or both sides of card 200. In an embodiment in which protective layer 210 comprises a laminate, the laminate can be a bleed laminate having an adhesive, or an over-laminate without an adhesive. In a particular embodiment, the laminate comprises a soft touch nylon laminate film (matte or gloss).

Card 200 can have a total thickness of about 20-50 mils, and more particularly about 40 mil to 45 mil, and even more particularly about 42-44 mil. In another embodiment, card 200 has a thickness of about 30 mil plus or minus about 10%.

Optionally, a magnetic stripe is applied via a magnetic stripe applicator to bamboo sheet 102a and/or 102b before being laminated to other layers, e.g. the other bamboo sheet assembly, or after assembly. Furthermore, the magnetic stripe can be applied to individual cards, or along a full sheet before cutting into individual cards.

Figure 3:
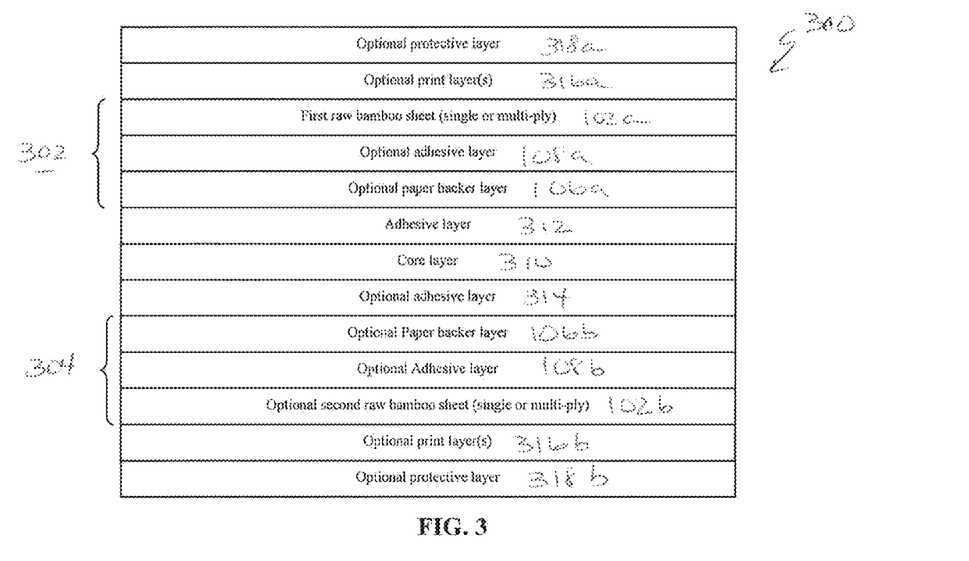
FIG. 3 is a cross-sectional view of a bamboo laminate card according to another embodiment of the invention.
Figure 4A:
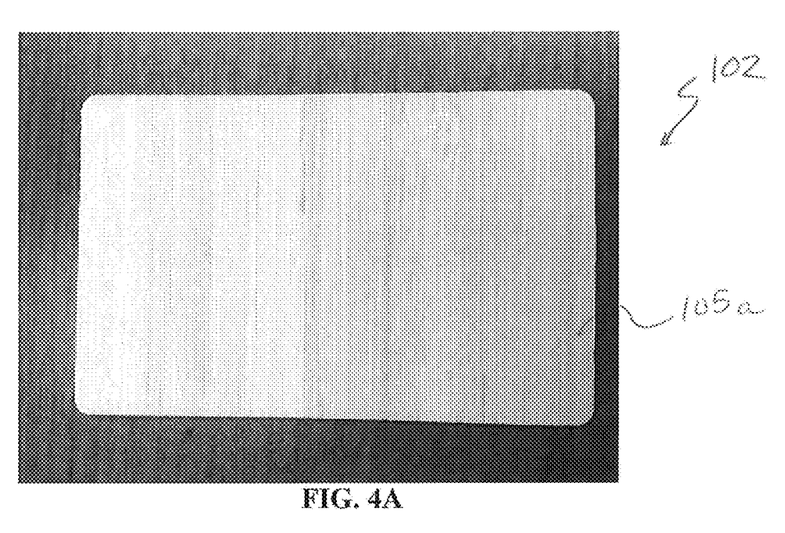
FIG. 4A is a top view of a multi-ply bamboo sheet according to an alternative embodiment of the invention.
Figure 4B:
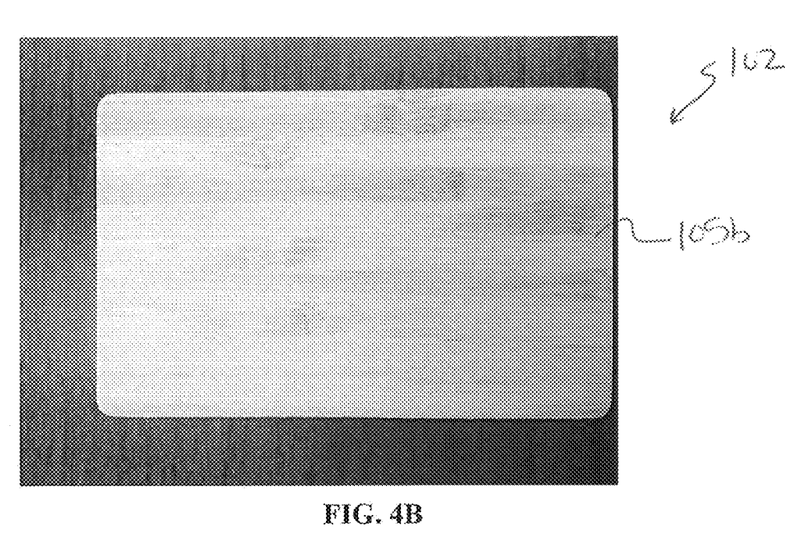
FIG. 4B is a bottom view of the bamboo sheet according to FIG. 4A.
Figure 4C:
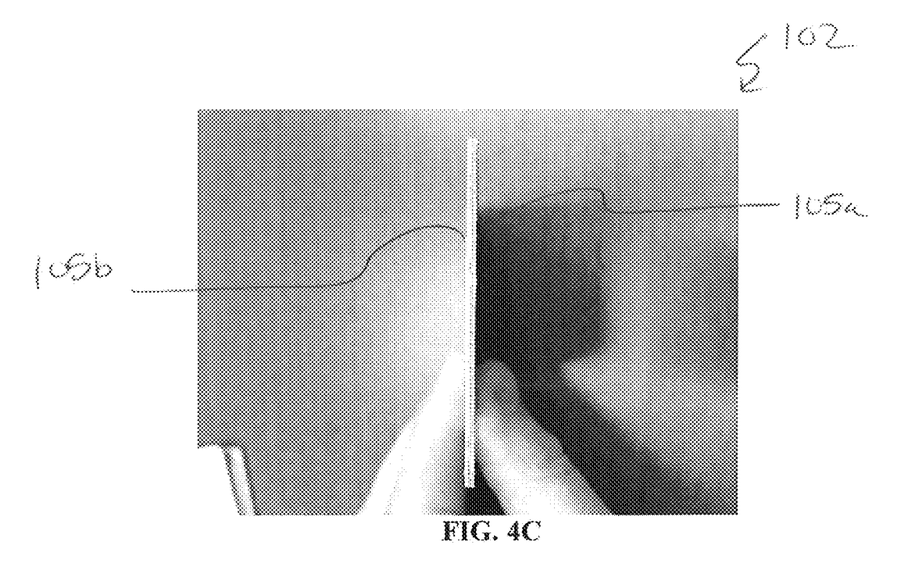
FIG. 4C is a side view of the bamboo sheet according to FIG. 4A.
Figure 4D:
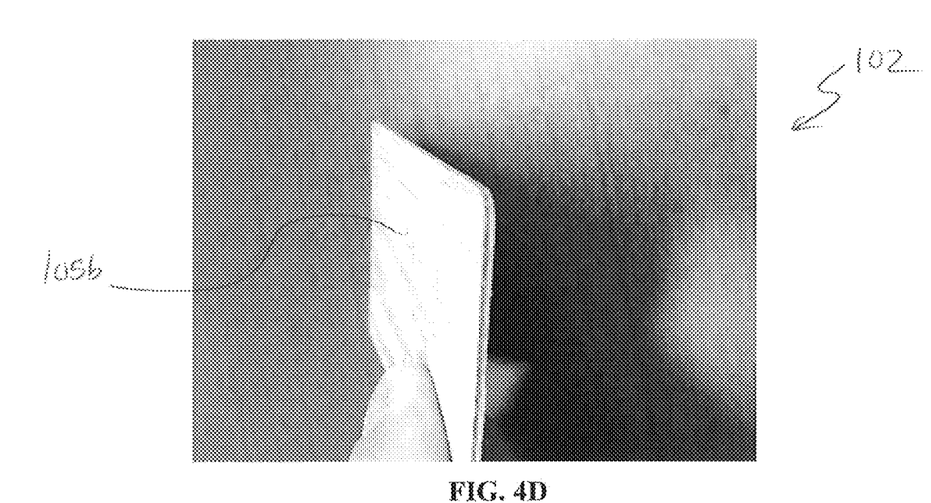
FIG. 4D is a side perspective view of the bamboo sheet according to FIG. 4A.

Referring to FIG. 3, and according to another embodiment of the invention, a card 300 generally comprises a first raw bamboo assembly 302 (including a bamboo sheet 102a optionally adhered to a paper backer layer 106a via an adhesive layer 108a) adhered to a core layer 310 via adhesive layer 312. Core layer 310 can comprise any of a variety of materials including, but not limited to, paper, paperboard, cardboard, metal, foil, foam, wood, bamboo, glass, wovens, nonwovens, or any of a combination thereof, and/or virgin and/or recycled plastics or polymers including polyvinyl chloride (PVC), styrene, polyethylene terephthalate (PETG), polylactic acid (PLA), polypropylene, polystyrene (HIPS) polyethylene, or any combination thereof. Core layer 310 can comprise single card or a large or full sheet format (for example, 28"×40" sheets) for containing a plurality of articles, such as a plurality of stored data cards, key fobs, or combinations thereof. Core layer 310 can comprise a single layer or "single core," or multiple layers adhered together or "split core."

In one embodiment, card 300 includes only a single raw bamboo assembly 302 such that only a first surface of card 300 has a patterned appearance. According to an alternative embodiment, an optional second bamboo assembly 304 (including a bamboo sheet 102b optionally adhered to a paper backer layer 106b via an adhesive layer 108b) is adhered to an opposite side of core layer 310 from first bamboo assembly 302 via a second adhesive layer 314, such that first and second bamboo sheets 102a and 102b form the exterior facing surfaces of card 300, and core layer 310 is sandwiched therebetween. In this embodiment, the patterned appearance direction of bamboo sheet 102a can be substantially parallel to the patterned appearance direction of bamboo sheet 102b, or can be substantially unparallel or perpendicular to the patterned appearance direction of bamboo sheet 102a for added durability as described above.

Adhesive layers 108a, 108b, 312, and 314 can comprise any of a variety of suitable adhesives including, but not limited to, a multi-part urethane adhesives, epoxies, acrylate adhesives, radiation activated or curable adhesives including UV, IR and/or ebeam adhesives, pressure activated adhesives, or any of a combination thereof. Adhesive layers 108a, 108b, 312, and 314 can be formed from the same adhesive or can be different adhesives.

As described with respect to the embodiment of FIG. 2, one or more optional print layer(s) 316 can be formed on first bamboo sheets 102a, and/or core layer 310 or second bamboo sheet 102b (if present). Print layer(s) 316 can comprise any of a variety or combination of text, graphics, colors, human readable indicia, machine readable indicia, images, customer information, foils, special imaging indicia such as interlaced images and the like, or any of a variety of indicia and/or embellishments. Print layer(s) 316 can be applied by using contact or contact-less methods including, but not limited to, flexography, lithography, laser, thermal, inkjet, drop-on-demand, xerography, screen printing (e.g. silkscreen), gravure, rotogravure, foil stamp, or combinations thereof. In one embodiment, print layer(s) 316 can be formed using high resolution printing techniques, and more particular computer-controlled digital-printing techniques such as, for example, laser imaging, ink jet including drop-on-demand (DOD) and continuous inkjet, thermal imaging, and/or xerographic imaging. A corresponding suitable ink, toner, or other printing medium is used depending the type(s) of printing methods including UV or radiation curable inks or toners, e-beam curable mediums, heat or IR curable, or combinations thereof. Sheet 102(a) and/or core 310, or alternatively sheet 102(b) (if present) can optionally be subjected to one or more printing pretreatments, including, but not limited to, corona treatment, flame treatment, application of a primer, or other treatments such that the surface of the bamboo sheet is modified to better bond with the printing medium.

Optional protective or laminate layer(s) 318a, 318b can be formed or applied over print layer(s) 316 to protect print layer(s) and/or bamboo sheet 102(a) and core 310 (or alternatively sheet 102(b) if present). Protective layer(s) 318 can comprise any of a variety laminates applied, such as by compression lamination, to one or both sides of card 300, or can comprise one or more coatings over one or both sides of card 300. In an embodiment in which protective layer 318 comprises a laminate, the laminate can be a bleed laminate having an adhesive, or an over-laminate without an adhesive. In a particular embodiment, the laminate comprises a soft touch nylon laminate film (matte or gloss).

Optionally, one or more magnetic stripes is applied via a magnetic stripe applicator to bamboo sheet 102a and/or 102b before being laminated to other layers, e.g. the core layer, and/or other bamboo sheet assembly, or after assembly of card 300 or sheet of cards. Furthermore, the magnetic stripe can be applied to individual cards, or along a full sheet before cutting into individual cards.

The cards according to embodiments of the invention can be manufactured by providing a first bamboo assembly (pre-manufactured with the paper backer or manufactured inline with the card). An adhesive layer is applied to the paper backer surface of the first bamboo assembly by lamination, printing, coating, or any of a variety of application methods. The first bamboo assembly is then coupled to either a core layer or directly to a second bamboo assembly, such as by compression lamination or nip rolling the layers together. In one embodiment, the first bamboo assembly is coupled directly to the second bamboo assembly. In an alternative embodiment, the first bamboo assembly is coupled to the core layer. A second adhesive is then applied to the paper backer of a second bamboo assembly and/or the core layer as described above, and the second bamboo assembly is coupled to the core layer on a side opposite the first bamboo assembly. The various adhesive layers are activated and/or cured, depending on the curing mechanism, at each step and/or after coupling of all layers to form a laminated assembly. The optional print layer(s) are then applied to one or both sides of the laminated assembly after an optional print pretreatment step. The print layer(s) are then cured or dried as appropriate. The optional protective layer(s) and/or further printing or magnetic stripe(s) are then applied to outer surfaces of the laminated assembly.

The cards can be manufactured as single, discrete cards in sheet format, or can be manufactured in large sheet format or in web form, such that after lamination of all layers and/or printing of the sheet or web, a plurality of cards are cut or converted from the sheet or web.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be formed or combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A bamboo laminate card comprising:
    a first sheet comprising a first layer of a plurality of strips, each strip comprising bamboo material having an elongated grass grain, the plurality of strips being laterally adjacently arranged to each other, wherein the elongated grass grains of the plurality of strips of the first layer defines an overall pattern formed on an outwardly facing surface of the first sheet; and
    at least one print layer formed on the outwardly facing surface of the first sheet, wherein the print layer comprises text, graphics, colors, readable indicia, or combinations thereof.

2. The bamboo laminate card of claim 1, further comprising:
    at least one substrate coupled to the first layer.

3. The bamboo laminate card of claim 2, wherein the at least one substrate comprises a core layer with or without an adhesive layer, a paper backer layer with or without an adhesive layer, or combinations thereof.

4. The bamboo laminate card of claim 1, wherein a direction of an elongated grass grain of a strip of the plurality of strips is substantially parallel to a direction of an elongated grass grain of an adjacent strip of the plurality of strips.

5. The bamboo laminate card of claim 1, wherein a direction of an elongated grass grain of a strip of the plurality of strips is substantially perpendicular to a direction of an elongated grass grain of an adjacent strip of the plurality of strips.

6. The bamboo laminate card of claim 1, further comprising a second sheet coupled the first sheet, the second sheet comprising:
    a first layer of a plurality of strips, each strip comprising bamboo material having an elongated grass grain, the strips being laterally adjacently arranged to each other, wherein the elongated grass grains of the plurality of strips of the first layer of the second sheet defines an overall pattern formed on an outwardly facing surface of the second sheet.

7. The bamboo laminate card of claim 6, further comprising:
    at least one substrate interposed between the first sheet and the second sheet, wherein the at least one substrate comprises a core layer with or without an adhesive layer, a paper backer layer with or without an adhesive layer, or combinations thereof.

8. The bamboo laminate card of claim 6, wherein the second sheet is arranged with respect to the first sheet such that a majority of the elongated grass grains of the overall pattern of the second sheet are substantially parallel to a majority of the elongated grass grains of overall pattern of the first sheet.

9. The bamboo laminate card of claim 6, wherein the second sheet is arranged with respect to the first sheet such that a majority of the elongated grass grains of the overall pattern of the second sheet are substantially perpendicular to a majority of the elongated grass grains of overall pattern of the first sheet.

10. The bamboo laminate card of claim 1, further comprising a protective layer, wherein the protective layer is formed over the first sheet, the at least one print layer, or both.

11. The bamboo laminate card of claim 1, further comprising a magnetic strip arranged on a portion of the outwardly facing surface of the first sheet.

12. The bamboo laminate card of claim 1, wherein the first sheet comprises a multi-ply sheet, the multi-ply sheet comprising:
    the first layer of the first sheet; and
    a second layer coupled to the first layer on a side opposite that of the outwardly facing surface, the second layer comprising a plurality of strips, each strip comprising bamboo material having an elongated grass grain, the plurality of strips being laterally adjacently arranged to each other.

13. The bamboo laminate card of claim 12, further comprising:
    at least one substrate interposed between the first layer and the second layer, coupled to the second layer on a side opposite the first layer, or both.

14. The bamboo laminate card of claim 13, wherein the at least one substrate comprises a core layer with or without an adhesive layer, a paper backer layer with or without an adhesive layer, or combinations thereof.

15. The bamboo laminate card of claim 12, wherein the second layer is arranged with respect to the first layer such that a majority of the elongated grass grains of the second layer are substantially parallel to a majority of the elongated grass grains of the first layer.

16. The bamboo laminate card of claim 12, wherein the second layer is arranged with respect to the first layer such that a majority of the elongated grass grains of the second layer are substantially perpendicular to a majority of the elongated grass grains of the first layer, thereby forming a bi-oriented first sheet.

17. The bamboo laminate card of claim 6, wherein at least one of the first sheet and the second sheet comprises a multi-ply sheet, the multi-ply sheet comprising—
the first layer of the first sheet or the second sheet; and
a second layer coupled to the first layer on a side opposite that of the outwardly facing surface, the second layer comprising a plurality of strips, each strip comprising bamboo material having an elongated grass grain, the plurality of strips being laterally adjacently arranged to each other.

18. The bamboo laminate card of claim 17, further comprising at least one substrate interposed between the first layer and the second layer, coupled to the second layer, or both, wherein the at least one substrate comprises a core layer with or without an adhesive layer, a paper backer layer with or without an adhesive layer, or combinations thereof.

19. The bamboo laminate card of claim 17, wherein the second layer is arranged with respect to the first layer such that a majority of the elongated grass grains of the second layer are substantially parallel to a majority of the elongated grass grains of the first layer.

20. The bamboo laminate card of claim 17, wherein the second layer is arranged with respect to the first layer such that a majority of the elongated grass grains of the second layer are substantially perpendicular to a majority of the elongated grass grains of the first layer, thereby forming a bi-oriented first sheet.

21. The bamboo laminate card of claim 17, wherein both the first sheet and the second sheet comprise a multi-ply sheet.

22. The bamboo laminate card of claim 1, wherein the card comprises a stored-value card, gift card, credit card, debit card, reward card, loyalty card, membership card, smart card, telephone card, key fob, and combinations thereof.

23. The bamboo laminate card of claim 1, wherein the card comprises an identification card selected from the group consisting of a driver's license, government card, access badge, passport, credentials, business card, healthcare card, insurance cards, fleet management cards, gaming cards, trading cards, and combinations thereof.

24. A bamboo laminate sheet assembly for forming a plurality of bamboo laminate cards therefrom, the sheet assembly comprising:
a first sheet comprising a first layer of a plurality of strips, each strip comprising bamboo material having an elongated grass grain, the plurality of strips being laterally adjacently arranged to each other, wherein the elongated grass grains of the plurality of strips of the first layer defines an overall pattern formed on an outwardly facing surface of the first sheet,
wherein the plurality of cards comprises transaction cards selected from the group consisting of stored-value cards, credit cards, debit cards, gift cards, loyalty cards, rewards cards, smart cards, telephone cards and combinations thereof, or identification cards selected from the group consisting drivers' licenses, access badges, passports, and combinations thereof.

25. The bamboo laminate sheet assembly of claim 24, further comprising:
at least one substrate coupled to the first layer.

26. The bamboo laminate sheet assembly of claim 25, wherein the at least one substrate comprises a core layer with or without an adhesive layer, a paper backer layer with or without an adhesive layer, or combinations thereof.

27. The bamboo laminate sheet assembly of claim 24, further comprising:
a second sheet coupled the first sheet, the second sheet comprising:
a first layer of a plurality of strips, each strip comprising bamboo material having an elongated grass grain, the strips being laterally adjacently arranged to each other,
wherein the elongated grass grains of the plurality of strips of the first layer of the second sheet defines an overall pattern formed on an outwardly facing surface of the second sheet.

28. The bamboo laminate sheet assembly of claim 27, further comprising:
at least one substrate interposed between the first sheet and the second sheet, coupled to the second sheet on a side opposite the first sheet, or both, wherein the at least one substrate comprises a core layer with or without an adhesive layer, a paper backer layer with or without an adhesive layer, or combinations thereof.

29. The bamboo laminate sheet assembly of claim 24, wherein the first sheet comprises a multi-ply sheet, the multi-ply sheet comprising:
the first layer of the first sheet; and
a second layer coupled to the first layer on a side opposite that of the outwardly facing surface, the second layer comprising a plurality of strips, each strip comprising bamboo material having an elongated grass grain, the plurality of strips being laterally adjacently arranged to each other.

30. The bamboo laminate sheet assembly of claim 29, further comprising:
at least one substrate interposed between the first layer and the second layer, coupled to the second layer on a side opposite the first layer, or both, wherein the at least one substrate comprises a core layer with or without an adhesive layer, a paper backer layer with or without an adhesive layer, or combinations thereof.

31. The bamboo laminate sheet assembly of claim 30, wherein at least one of the first sheet and the second sheet comprises a multi-ply sheet, the multi-ply sheet comprising—
the first layer of the first sheet or the second sheet; and
a second layer coupled to the first layer on a side opposite that of the outwardly facing surface, the second layer comprising a plurality of strips, each strip comprising bamboo material having an elongated grass grain, the plurality of strips being laterally adjacently arranged to each other.

32. The bamboo laminate sheet assembly of claim 31, further comprising at least one substrate interposed between the first layer and the second layer, coupled to the second layer, or both, wherein the at least one substrate comprises a core layer with or without an adhesive layer, a paper backer layer with or without an adhesive layer, or combinations thereof.

* * * * *

UNITED STATES PATENT AND TRADEMARK OFFICE
CERTIFICATE OF CORRECTION

PATENT NO.       : 9,844,922 B2
APPLICATION NO.  : 14/692313
DATED            : December 19, 2017
INVENTOR(S)      : Ricketts et al.

Page 1 of 1

It is certified that error appears in the above-identified patent and that said Letters Patent is hereby corrected as shown below:

In the Claims

Claim 27, Column 12, Line 7:
Between "coupled" and "the" insert -- to --.

Signed and Sealed this
Tenth Day of April, 2018

Andrei Iancu
*Director of the United States Patent and Trademark Office*